United States Patent
Cho et al.

(10) Patent No.: US 12,455,407 B2
(45) Date of Patent: Oct. 28, 2025

(54) ADHESIVE FILM, OPTICAL MEMBER COMPRISING THE SAME AND OPTICAL DISPLAY COMPRISING THE SAME

(71) Applicants: SAMSUNG SDI CO., LTD., Yongin-si (KR); SAMSUNG ELECTRONICS CO., LTD., Suwon-si (KR)

(72) Inventors: Ik Hwan Cho, Suwon-si (KR); Byeong Do Kwak, Suwon-si (KR); Il Jin Kim, Suwon-si (KR); Sung Hyun Mun, Suwon-si (KR); Gwang Hwan Lee, Suwon-si (KR); Jae Hyun Han, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 659 days.

(21) Appl. No.: 15/449,502

(22) Filed: Mar. 3, 2017

(65) Prior Publication Data

US 2017/0253769 A1    Sep. 7, 2017

(30) Foreign Application Priority Data

Mar. 3, 2016    (KR) .................. 10-2016-0025914
Dec. 14, 2016   (KR) .................. 10-2016-0170835

(51) Int. Cl.
*G02B 5/30* (2006.01)
*B32B 7/12* (2006.01)
(Continued)

(52) U.S. Cl.
CPC .............. *G02B 5/3033* (2013.01); *B32B 7/12* (2013.01); *B32B 27/08* (2013.01); *B32B 27/281* (2013.01);
(Continued)

(58) Field of Classification Search
None
See application file for complete search history.

(56) References Cited

U.S. PATENT DOCUMENTS

2007/0149715 A1   6/2007 Lee et al.
2012/0121878 A1*  5/2012 Bilcai ................ C08L 63/00
                                                428/220

(Continued)

FOREIGN PATENT DOCUMENTS

CN    105567137 A      5/2016
JP    2009-110026 A  † 5/2009

(Continued)

OTHER PUBLICATIONS

Korean Office action from corresponding Korean Patent Application No. 10-2016-0170835, Korean Patent Application mailed Jul. 22, 2019 (4 pgs.).

(Continued)

*Primary Examiner* — Frank J Vineis
*Assistant Examiner* — Nicole T Gugliotta
(74) *Attorney, Agent, or Firm* — Womble Bond Dickinson (US) LLP (57) ABSTRACT

An adhesive film, an optical member including the same, and an optical display including the same are provided. An adhesive film has a tan δ ratio at 25° C. of about 1 to about 2 as calculated by Equation 1 and a tan δ ratio at −20° C. of about 0.1 to about 1.5 as calculated by Equation 2, and is formed of an adhesive composition including a monomer mixture including a hydroxyl group-containing (meth) acrylic acid ester.

21 Claims, 3 Drawing Sheets

(51) Int. Cl.
    *B32B 27/08*       (2006.01)
    *B32B 27/28*       (2006.01)
    *B32B 27/30*       (2006.01)
    *B32B 27/32*       (2006.01)
    *B32B 27/36*       (2006.01)
    *C08F 220/18*    (2006.01)
    *C09J 7/00*        (2018.01)
    *C09J 7/10*        (2018.01)
    *C09J 133/06*    (2006.01)
    *G02B 1/10*        (2015.01)

(52) U.S. Cl.
    CPC .......... *B32B 27/308* (2013.01); *B32B 27/325* (2013.01); *B32B 27/36* (2013.01); *B32B 27/365* (2013.01); *C09J 7/10* (2018.01); *C09J 133/066* (2013.01); *B32B 2250/02* (2013.01); *B32B 2250/24* (2013.01); *B32B 2255/10* (2013.01); *B32B 2255/26* (2013.01); *B32B 2307/202* (2013.01); *B32B 2307/412* (2013.01); *B32B 2307/50* (2013.01); *B32B 2307/546* (2013.01); *B32B 2457/20* (2013.01); *B32B 2457/202* (2013.01); *B32B 2457/206* (2013.01); *B32B 2457/208* (2013.01); *C09J 2203/318* (2013.01); *C09J 2301/302* (2020.08); *C09J 2301/312* (2020.08); *C09J 2301/314* (2020.08); *C09J 2433/00* (2013.01)

(56) References Cited

U.S. PATENT DOCUMENTS

| | | | | |
|---|---|---|---|---|
| 2013/0136874 | A1* | 5/2013 | Xia | G02B 1/04 |
| | | | | 156/99 |
| 2013/0220510 | A1* | 8/2013 | Yamamoto | C09J 7/38 |
| | | | | 156/60 |
| 2014/0065417 | A1† | 3/2014 | Higashi | |
| 2014/0248489 | A1† | 9/2014 | Higashi | |
| 2017/0002235 | A1† | 1/2017 | Higashi | |
| 2017/0121565 | A1† | 5/2017 | Yasui | |

FOREIGN PATENT DOCUMENTS

| | | | |
|---|---|---|---|
| JP | 2015-016653 A | † | 1/2015 |
| KR | 10-2007-0055363 A | | 5/2007 |
| KR | 10-2008-0052897 A | | 6/2008 |
| KR | 10-2008-0052897 | † | 12/2008 |
| WO | 2012-150682 A1 | † | 11/2012 |
| WO | 2013-047210 A1 | † | 4/2013 |
| WO | 2015-152070 A1 | † | 10/2015 |

OTHER PUBLICATIONS

China Office Action in corresponding China Patent Application No. 201710123149.2, China Office action mailed Sep. 27, 2019 (11 pgs.).

\* cited by examiner
† cited by third party

ADHESIVE FILM, OPTICAL MEMBER COMPRISING THE SAME AND OPTICAL DISPLAY COMPRISING THE SAME

CROSS-REFERENCE TO RELATED APPLICATIONS

This application claims priority to and the benefit of Korean Patent Application No. 10-2016-0025914, filed on Mar. 3, 2016 in the Korean Intellectual Property Office, and Korean Patent Application No. 10-2016-0170835, filed on Dec. 14, 2016 in the Korean Intellectual Property Office, the entire disclosures of both of which are incorporated herein by reference.

BACKGROUND

1. Field

Aspects of embodiments of the present invention relate to an adhesive film, an optical member including the same, and an optical display including the same.

2. Description of the Related Art

An optical display includes any of display members including a window film, a conductive film, an organic light emitting diode, and the like. A touch pad has a stacked structure in which a transparent adhesive film, such as an optically clear adhesive (OCA) film, is interposed between the window film and the conductive film. The touch pad is operated in response to electrical signals generated by variation in capacitance occurring when a human body or a certain material touches the window film. The transparent adhesive film may also be stacked between two of the window film, the conductive film, a polarizing plate, and the organic light emitting diode.

Recently, a flexible display capable of being folded and unfolded has been developed in the field of optical displays. Since the flexible display can be folded and unfolded, the flexible display can be produced in various shapes and has a slim, lightweight structure and high impact resistance.

Various optical members of the flexible display may also be required to have flexibility. Since the transparent adhesive film is interposed between the window film and the conductive film, the transparent adhesive film is required to have good adhesive strength at both surfaces thereof. In addition, the adhesive film is required to have good foldability not only at room temperature but also at high temperature in order to be used in the flexible display. In addition, the flexible display is held in a folded state for a long period of time to form a pleat on the adhesive film, thereby causing deterioration in reliability, optical transparency, and durability.

The background technique of the present invention is disclosed in Korean Patent Publication No. 2007-0055363 A.

SUMMARY

According to an aspect of embodiments of the present invention, an adhesive film has good properties in terms of foldability at low temperature and room temperature, mechanical properties, reliability, optical transparency, and durability.

In accordance with an aspect of one or more embodiments of the present invention, an adhesive film has a tan δ ratio at 25° C. of about 1 to about 2 as calculated by Equation 1 and a tan δ ratio at −20° C. of about 0.1 to about 1.5 as calculated by Equation 2, and is formed of an adhesive composition including a monomer mixture including a hydroxyl group-containing (meth)acrylic acid ester, wherein $$\tan \delta \text{ ratio at } 25°\text{ C.} = ([\tan \delta]_{100/25°\ C.})/([\tan \delta]_{1/25°\ C.}),\quad \text{Equation 1}$$

where $[\tan \delta]_{1/25°\ C.}$ is tan δ of the adhesive film at about 1 rad/sec and about 25° C., and $[\tan \delta]_{100/25°\ C.}$ is tan δ of the adhesive film at about 100 rad/sec and about 25° C., and $$\tan \delta \text{ ratio at } -20°\text{ C.} = ([\tan \delta]_{100/-20°\ C.})/([\tan \delta]_{1/-20°\ C.}),\quad \text{Equation 2}$$

where $[\tan \delta]_{1/-20°\ C.}$ is tan δ of the adhesive film at about 1 rad/sec and about −20° C., and $[\tan \delta]_{100/-20°\ C.}$ is tan δ of the adhesive film at about 100 rad/sec and about −20° C.

In accordance with another aspect of the present invention, an optical member includes an optical film and the adhesive film formed on at least one surface of the optical film. A window film may include the optical member and a window coating layer on the optical member.

In accordance with a further aspect of the present invention, an optical display includes the adhesive film.

DETAILED DESCRIPTION

Hereinafter, some embodiments of the present invention will be described in further detail with reference to the accompanying drawings to allow those skilled in the art to easily practice the present invention. It should be understood that the present invention may be embodied in different ways and is not limited to the following embodiments. In the drawings, portions irrelevant to the description may be omitted for clarity. Like components are denoted by like reference numerals throughout the specification.

As used herein, spatially relative terms such as "upper" and "lower" are defined with reference to the accompanying drawings. Thus, it is to be understood that "upper" can be used interchangeably with "lower." It will be understood that when a layer is referred to as being "on" another layer, it can be directly formed on the other layer, or one or more intervening layers may also be present. Thus, it is to be understood that when a layer is referred to as being "directly on" another layer, no intervening layer is interposed therebetween.

As used herein, the term "(meth)acryl" refers to acryl and/or methacryl.

Herein, the term "copolymer" may include oligomers, polymers, and resins.

Figure 3A:
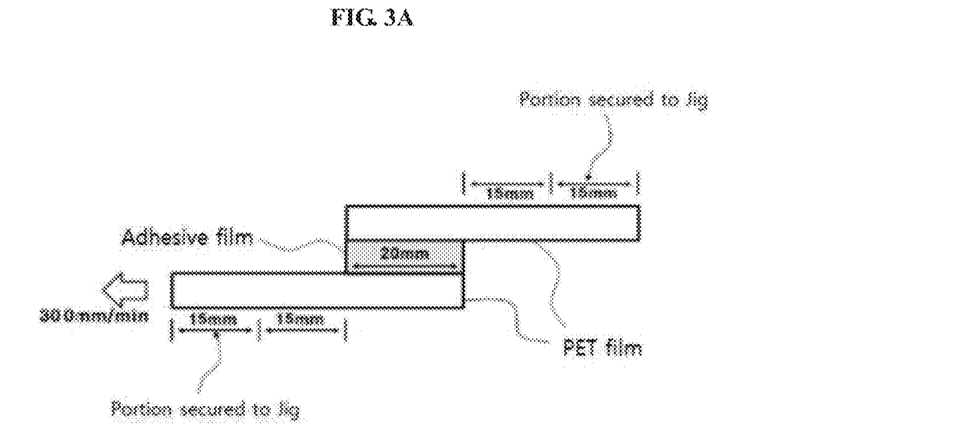
FIGS. 3A and 3B are conceptual diagrams of a specimen for measuring restoration force.
Figure 3B:
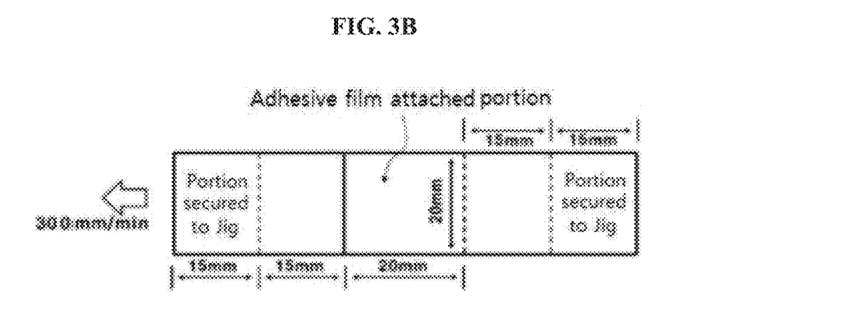
Figure 4:
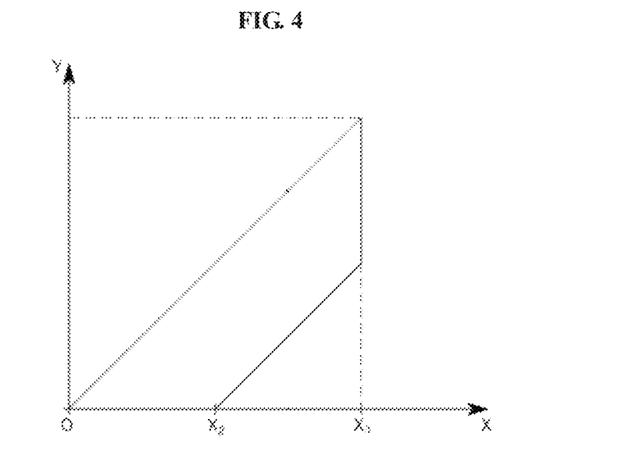
FIG. 4 is a graph for calculation of restoration force.

Herein, "restoration force" can be obtained by the following procedure. Referring to FIGS. 3A and 3B, assuming that both ends of a polyethylene terephthalate (PET) film (thickness: 75 μm) having a size of 50 mm×20 mm are defined as a first end and a second end, respectively, two PET films are attached to each other via an adhesive film having a size of 20 mm×20 mm such that two ends of the PET films are attached to each other by the adhesive film in order of first end of one PET film/adhesive film/second end of another PET film, thereby providing a specimen having a contact area of 20 mm×20 mm between each of the PET films and the adhesive film. Referring to FIGS. 3A and 3B and FIG. 4, with one of jigs secured at 25° C., the other jig is pulled at about 300 mm/min until the adhesive film has a length ($X_3$, unit: μm) of 1,000% of an initial thickness ($X_0$, unit: μm) thereof, that is, 10 times the initial thickness of the adhesive film, and is maintained for about 10 seconds, followed by restoring the other jig at the same speed (i.e. at about 300 mm/min) to obtain a stretched length ($X_2$, unit: μm) of the adhesive film upon application of 0 kPa to the adhesive film. In the graph of FIG. 4, the X-axis is the stretched length of the adhesive film, and the Y-axis is force applied to the adhesive film. Restoration force is calculated by Equation 5:

Restoration force=$(1-(X_2)/(X_3))\times100$.     Equation 5

The adhesive film may have an initial thickness of about 20 μm to about 300 μm. Restoration force can be measured by a TA.XT_Plus Texture Analyzer (Stable Micro System Ltd.).

Herein, the term "folding conditions" means the following conditions: an adhesive film is placed between corona-treated polyethylene terephthalate (PET) films (thickness: 50 μm), bonded to the PET films through rollers such that the corona-treated surfaces of the PET films adjoin the adhesive film, followed by aging at room temperature for 12 hours. Next, the resultant is cut into a specimen having a size of 70 mm×140 mm (width×length), which in turn is secured to a flexibility evaluation instrument CFT-200 (Covotech Co., Ltd.) using an adhesive (4965, Tesa Co., Ltd.), followed by 100,000 cycles of folding and unfolding the specimen (length: 140 mm) in the longitudinal direction at −20° C. or 25° C. and at a folding frequency of 30 cycles/min such that the radius of curvature becomes 3 mm (1 cycle being defined as an operation of folding the specimen in half once and unfolding the specimen).

Herein, "good foldability" means a case where a specimen does not suffer from generation of striped patterns at a folded portion of an adhesive film, fracture, slight lifting or peeling of the adhesive film, or cracks in the PET film under the folding conditions.

Herein, the term "average particle diameter" of organic nanoparticles refers to a particle diameter thereof, as measured in a water-based or organic solvent using a Zetasizer nano-ZS (Malvern Co., Ltd.) and represented by a Z-average value.

Herein, about 25° C. represents room temperature, about −20° C. represents low temperature, and about 80° C. represents high temperature.

Herein, assuming the temperature in mentioning "modulus," "tan δ" or "tan δ ratio" is X° C., X° C. may mean not only X° C., but also a temperature of about $(X-5)°$ C. to about $(X+5)°$ C.

Herein, an adhesive film according to an embodiment of the present invention will be described.

An adhesive film according to an embodiment may have a tan δ ratio of about 1 to about 2 as calculated by Equation 1 and a tan δ ratio of about 0.1 to about 1.5 as calculated by Equation 2. Within this range, the adhesive film can exhibit good foldability both at room temperature and at low temperature to be used in a flexible display.

tan δ ratio at 25° C.=$([\tan \delta]_{100/25°\ C.})/([\tan \delta]_{1/25°\ C.})$,     Equation 1 where $[\tan \delta]_{1/25°\ C.}$ is tan δ of the adhesive film at about 1 rad/sec and about 25° C., and $[\tan \delta]_{100/25°\ C.}$ is tan δ of the adhesive film at about 100 rad/sec and about 25° C.

tan δ ratio at −20° C.=$([\tan \delta]_{100/-20°\ C.})/([\tan \delta]_{1/-20°\ C.})$,     Equation 2 where $[\tan \delta]_{1/-20°\ C.}$ is tan δ of the adhesive film at about 1 rad/sec and about −20° C., and $[\tan \delta]_{100/-20°\ C.}$ is tan δ of the adhesive film at about 100 rad/sec and about −20° C.

Each of the values of Equation 1 and Equation 2 can be used as an index for evaluation of foldability of the adhesive film at about 25° C. or about −20° C. tan δ can be represented by a ratio of loss modulus to storage modulus (loss modulus/storage modulus). As in the experimental example described below, each of loss modulus and storage modulus is measured while increasing a shear rate from a low value to a high value at a certain temperature. As such, since the adhesive film has a specific ratio of tan δ at a low shear rate to tan δ at a high shear rate, it is possible to evaluate the degree of relieving stress applied to the adhesive film upon folding in evaluation of foldability.

The adhesive film may have a tan δ ratio at 25° C. of about 1.0, 1.1, 1.2, 1.3, 1.4, 1.5, 1.6, 1.7, 1.8, 1.9, or about 2.0, as calculated by Equation 1. In an embodiment, the adhesive film may have a tan δ ratio at 25° C. in a range from one of the numerical values set forth above to another of the numerical values set forth above. For example, the adhesive film may have a tan δ ratio at 25° C. of about 1.1 to about 1.8, as calculated by Equation 1.

The adhesive film may have a tan δ ratio at −20° C. of about 0.1, 0.2, 0.3, 0.4, 0.5, 0.6, 0.7, 0.8, 0.9, 1.0, 1.1, 1.2, 1.3, 1.4, or about 1.5, as calculated by Equation 2. In an embodiment, the adhesive film may have a tan δ ratio at −20° C. in a range from one of the numerical values set forth above to another of the numerical values set forth above. For example, the adhesive film may have a tan δ ratio at −20° C. of about 0.2 to about 1.4, and, in one embodiment, about 0.3 to about 1.2, as calculated by Equation 2.

The adhesive film may have a tan δ at −20° C. and 1 rad/sec of about 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, or about 0.70. In an embodiment, the adhesive film may have a tan δ at −20° C. and 1 rad/sec in a range from one of the numerical values set forth above to another of the numerical values set forth above. For example, the adhesive film may have a tan δ of about 0.3 to about 0.7 at −20° C. and 1 rad/sec.

The adhesive film may have a storage modulus at −20° C. and 1 rad/sec of about 50 kPa, 51 kPa, 52 kPa, 53 kPa, 54 kPa, 55 kPa, 56 kPa, 57 kPa, 58 kPa, 59 kPa, 60 kPa, 61 kPa, 62 kPa, 63 kPa, 64 kPa, 65 kPa, 66 kPa, 67 kPa, 68 kPa, 69 kPa, 70 kPa, 71 kPa, 72 kPa, 73 kPa, 74 kPa, 75 kPa, 76 kPa, 77 kPa, 78 kPa, 79 kPa, 80 kPa, 81 kPa, 82 kPa, 83 kPa, 84 kPa, 85 kPa, 86 kPa, 87 kPa, 88 kPa, 89 kPa, 90 kPa, 91 kPa, 92 kPa, 93 kPa, 94 kPa, 95 kPa, 96 kPa, 97 kPa, 98 kPa, 99 kPa, or about 100 kPa. In an embodiment, the adhesive film may have a storage modulus at −20° C. and 1 rad/sec in a range from one of the numerical values set forth above to another of the numerical values set forth above. For example, the adhesive film may have a storage modulus of about 100 kPa or less, and, in one embodiment, about 50 kPa to about 100 kPa, at −20° C. and 1 rad/sec.

The adhesive film may have a tan δ at −20° C. and 100 rad/sec of about 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, or about 0.75. In an embodiment, the adhesive film may have a tan δ at −20° C. and 100 rad/sec in a range from one of the numerical values set forth above to another of the numerical values set forth above. For example, the adhesive film may have a tan δ of about 0.1 to about 0.75 at −20° C. and 100 rad/sec.

The adhesive film may have a storage modulus at −20° C. and 100 rad/sec of about 200 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, 500 kPa, 510 kPa, 520 kPa, 530 kPa, 540 kPa, 550 kPa, 560 kPa, 570 kPa, 580 kPa, 590 kPa, 600 kPa, 610 kPa, 620 kPa, 630 kPa, 640 kPa, 650 kPa, 660 kPa, 670 kPa, 680 kPa, 690 kPa, 700 kPa, 710 kPa, 720 kPa, 730 kPa, 740 kPa, 750 kPa, 760 kPa, 770 kPa, 780 kPa, 790 kPa, 800 kPa, 810 kPa, 820 kPa, 830 kPa, 840 kPa, 850 kPa, 860 kPa, 870 kPa, 880 kPa, 890 kPa, 900 kPa, 910 kPa, 920 kPa, 930 kPa, 940 kPa, 950 kPa, 960 kPa, 970 kPa, 980 kPa, 990 kPa, or about 1000 kPa. In one embodiment, the adhesive film may have a storage modulus at −20° C. and 100 rad/sec in a range from one of the numerical values set forth above to another of the numerical values set forth above. For example, the adhesive film may have a storage modulus of about 1,000 kPa or less, and, in one embodiment, about 200 kPa to about 1,000 kPa, at −20° C. and 100 rad/sec. Within this range, the adhesive film can exhibit good foldability at low temperature and does not suffer from deformation when exposed to external force.

The adhesive film may have a tan δ of about 0.2 to about 0.3 and a storage modulus of about 15 kPa or higher, and, in one embodiment, about 18 kPa to about 35 kPa, at 25° C. and 1 rad/sec. The adhesive film may have a tan δ of about 0.3 to about 0.5 and a storage modulus of about 20 kPa or higher, and, in one embodiment, about 25 kPa to about 70 kPa, at 25° C. and 100 rad/sec. Within this range, the adhesive film can exhibit good foldability at room temperature, can permit an increase in the number of cycles in foldability testing, and can exhibit good properties in terms of adhesive strength and reliability.

The adhesive film may have a gel fraction of about 70% or more, and, in one embodiment, about 70% to about 85%, as calculated by Equation 3. Within this range, the adhesive film can exhibit good mechanical properties and durability.

$$\text{Gel fraction} = (WC-WA)/(WB-WA) \times 100, \quad \text{Equation 3}$$

where WA is the weight of a wire mesh, WB is the total weight of the wire mesh and about 1 g of an adhesive film wrapped by the wire mesh so as not to leak therefrom, and WC is the total weight of the wire mesh and the dried adhesive film, in which the adhesive film wrapped by the wire mesh is completely dipped in a sample bottle containing 50 cc of ethyl acetate, left for about 1 day, and dried at about 100° C. for about 12 hours.

As such, the adhesive film has the gel fraction according to Equation 3 to provide good mechanical properties and exhibits good properties in terms of tan δ ratios according to Equation 1 and Equation 2 to provide good foldability at room temperature and low temperature. Particularly, the adhesive film has the gel fraction to provide good mechanical properties and exhibits good properties in terms of tan δ ratio according to Equation 2 to provide good foldability at low temperature.

The adhesive film may be formed of an adhesive composition according to an embodiment of the present invention. The adhesive composition will be described in further detail below.

The adhesive film may have a storage modulus at 80° C. and 1 rad/sec of about 15 kPa or more, and, in one embodiment, about 15 kPa to about 32 kPa, and, in one embodiment, about 18 kPa to about 30 kPa. Within this range, the adhesive film can exhibit good properties in terms of durability, reliability (i.e. no occurrence of bubbles and slight lifting), and foldability.

The adhesive film may have a peel strength at 25° C. of about 700 gf/inch or higher, and, in one embodiment, about 800 gf/inch to about 2,000 gf/inch. Within this range, the adhesive film allows stable attachment of an adherend thereto, can exhibit high reliability, and can prevent or substantially prevent delamination upon folding.

The adhesive film may have a haze of about 3.0% or less, and, in one embodiment, about 0.1% to about 0.95%, and a total light transmittance of about 90% or higher, and, in one embodiment, about 95% to about 99%, in the visible region (for example: wavelength of 380 nm to 780 nm). Within this range, the adhesive film has good transparency and can be used in an optical display. The adhesive film may have a thickness of about 10 μm to about 300 μm, and, in one embodiment, about 20 μm to about 150 μm. Within this thickness range, the adhesive film can be used in an optical display.

The adhesive film may have a resistance variation rate of about 3% or less, and, in one embodiment, about 0% to about 3%, as calculated by Equation 4. Within this range, the adhesive film can prevent or substantially prevent increase in resistance when attached to an adherend such as metal and can prevent or substantially prevent corrosion of such an adherend.

$$\text{Resistance variation rate } (\%) = (P^2-P^1)/P^1 \times 100, \quad \text{Equation 4}$$

where $P^1$ is the initial resistance (unit: Ω) of a specimen having electrodes at both ends of an adhesive film, and $P^2$ is the resistance (unit: Ω) of the specimen, as measured after the specimen is left at about 60° C. and about 95% RH for about 250 hours.

The adhesive film may have a glass transition temperature of about −100° C. to less than about −30° C., and, in one embodiment, about −80° C. to about −35° C. Within this range, the adhesive film can exhibit good viscoelasticity at low temperature and at high temperature.

The adhesive film may be produced by coating the adhesive composition according to an embodiment of the invention onto a release film, followed by drying and curing. The adhesive composition according to an embodiment of the present invention will be described.

The adhesive composition may include a monomer mixture and an initiator, in which the monomer mixture may form a (meth)acrylic copolymer.

The (meth)acrylic copolymer formed of the monomer mixture may have an index of refraction of about 1.40 to about 1.70, and, in one embodiment, about 1.48 to about 1.60. Within this range, the adhesive film formed of the adhesive composition can maintain transparency when stacked together with other optical films.

The (meth)acrylic copolymer formed of the monomer mixture may have a glass transition temperature Tg of about −150° C. to about −13° C., and, in one embodiment, about −100° C. to about −20° C. Within this range, the adhesive film has good foldability and can exhibit good adhesion and reliability in a wide temperature range.

In one embodiment, the monomer mixture may include a hydroxyl group-containing (meth)acrylic acid ester (hereinafter, hydroxyl group-containing (meth)acrylic acid ester), a homopolymer of which has a glass transition temperature of about 0° C. or less, and, in one embodiment, about −100° C. to about 0° C., and an alkyl group-containing (meth)acrylic acid ester.

The hydroxyl group-containing (meth)acrylic acid ester can reduce storage modulus of the adhesive film at low temperature and at room temperature and can increase adhesive strength of the adhesive film. The hydroxyl group-containing (meth)acrylic acid ester may include a (meth)acrylic acid ester containing a $C_4$ to $C_{20}$ alkyl group having at least one hydroxyl group. Thus, the adhesive film can exhibit good foldability at room temperature and low temperature. In an embodiment, the hydroxyl group-containing (meth)acrylic acid ester may include at least one of 4-hydroxybutyl (meth)acrylate (homopolymer of which has a glass transition temperature of about −32° C.), 2-hydroxybutyl (meth)acrylate (homopolymer of which has a glass transition temperature of about −49° C.), and 6-hydroxyhexyl (meth)acrylate. In the monomer mixture for the (meth)acrylic copolymer, the hydroxyl group-containing (meth)acrylic acid ester may be present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %. In an embodiment, the hydroxyl group-containing (meth)acrylic acid ester may be present in an amount in a range from one of the numerical values set forth above to another of the numerical values set forth above, in the monomer mixture for the (meth)acrylic copolymer. For example, the hydroxyl group-containing (meth)acrylic acid ester may be present in an amount of about 1 wt % to about 30 wt %, and, in one embodiment, about 10 wt % to about 25 wt %, and, in one embodiment, about 15 wt % to about 20 wt %, in the monomer mixture for the (meth)acrylic copolymer. Within this range, the adhesive film can have good foldability at room temperature and low temperature and can exhibit good adhesion.

The alkyl group-containing (meth)acrylic acid ester forms a matrix of the adhesive film and can improve mechanical properties of the adhesive film. The alkyl group-containing (meth)acrylic acid ester may include an unsubstituted $C_1$ to $C_{20}$ linear or branched alkyl group-containing (meth)acrylic acid ester. For example, the alkyl group-containing (meth)acrylic acid ester may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, and lauryl (meth)acrylate. A $C_4$ to $C_8$ alkyl group-containing (meth)acrylic acid ester can further improve initial adhesive strength. A branched alkyl group-containing (meth)acrylic acid ester can further improve initial adhesive strength. The alkyl group-containing (meth)acrylic acid ester may be present in an amount of about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, or about 99 wt % in the monomer mixture for the (meth)acrylic copolymer. In an embodiment, the alkyl group-containing (meth)acrylic acid ester may be present in an amount in a range from one of the numerical values set forth above to another of the numerical values set forth above in the monomer mixture for the (meth)acrylic copolymer. For example, the alkyl group-containing (meth)acrylic acid ester may be present in an amount of about 70 wt % to about 99 wt %, and, in one embodiment, about 75 wt % to about 90 wt %, and, in one embodiment, about 80 wt % to about 85 wt %, in the monomer mixture for the (meth)acrylic copolymer. Within this range, the adhesive film can have good foldability at room temperature and low temperature.

In an embodiment, the monomer mixture may include about 10 wt % to about 25 wt % of the hydroxyl group-containing (meth)acrylic acid ester and about 75 wt % to about 90 wt % of the alkyl group-containing (meth)acrylic acid ester in the total weight of the hydroxyl group-containing (meth)acrylic acid ester and the alkyl group-containing (meth)acrylic acid ester, in which the (meth)acrylic copolymer may be a non-carboxylic acid based copolymer. Within this range, the adhesive film has the tan δ ratio as described above to exhibit good foldability at low temperature and room temperature.

The monomer mixture for the (meth)acrylic copolymer may further include a comonomer capable of polymerizing at least one of the hydroxyl group-containing (meth)acrylic acid ester and the alkyl group-containing (meth)acrylic acid ester. The comonomer may be optionally present in an amount of about 30 wt % or less in the monomer mixture. The comonomer can provide an additional function to the adhesive film, or can compensate for the functions of the hydroxyl group-containing (meth)acrylic acid ester and the alkyl group-containing (meth)acrylic acid ester.

The comonomer may include at least one of an ethylene oxide group-containing monomer, a propylene oxide group-containing monomer, an amine group-containing monomer, an amide group-containing monomer, an alkoxy group-containing monomer, a phosphate group-containing monomer, a sulfonic acid group-containing monomer, a phenyl group-containing monomer, and a silane group-containing monomer.

The ethylene oxide group-containing monomer may include at least one (meth)acrylate monomer containing one or more ethylene oxide groups (—$CH_2CH_2O$—). For example, the ethylene oxide group-containing monomer may include any of polyethylene oxide alkyl ether (meth)acrylates, such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and polyethylene oxide mono-tert-butyl ether (meth)acrylate, without being limited thereto.

The propylene oxide group-containing monomer may include polypropylene oxide alkyl ether (meth)acrylate, such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, polypropylene oxide mono-tert-butyl ether (meth)acrylate, without being limited thereto.

The amine group-containing monomer may include any of amine group-containing (meth)acrylic monomers, such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and methacryloxyethyltrimethyl ammonium chloride (meth)acrylate, without being limited thereto.

The amide group-containing monomer may include any of amide group-containing (meth)acrylic monomers, such as (meth)acrylamide, N-methyl acrylamide, N-methyl methacrylamide, N-methylol (meth)acrylamide, N-methoxymethyl (meth)acrylamide, N,N-methylene bis(meth)acrylamide, and 2-hydroxylethyl acrylamide, without being limited thereto.

The alkoxy group-containing monomer may include any of 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and 3-butoxyhexyl (meth)acrylate, without being limited thereto.

The phosphate group-containing monomer may include any of phosphate group-containing acrylic monomers, such as 2-methacryloyloxyethyldiphenylphosphate (meth)acrylate, trimethacryloyloxyethylphosphate (meth)acrylate, and triacryloyloxyethylphosphate (meth)acrylate, without being limited thereto.

The sulfonic acid group-containing monomer may include any of sulfonic acid group-containing acrylic monomers, such as sodium sulfopropyl (meth)acrylate, sodium 2-sulfoethyl (meth)acrylate, and sodium 2-acrylamido-2-methylpropane sulfonate, without being limited thereto.

The phenyl group-containing monomer may include any of phenyl group-containing acrylic vinyl monomers, such as p-tert-butylphenyl (meth)acrylate, o-biphenyl (meth)acrylate, and phenoxyethyl (meth)acrylate, without being limited thereto.

The silane group-containing monomer may include any of silane group-containing vinyl monomers, such as 2-acetoacetoxyethyl (meth)acrylate, vinyltrimethoxysilane, vinyltriethoxysilane, vinyl tris(2-methoxyethyl)silane, vinyltriacetoxysilane, and (meth)acryloyloxypropyltrimethoxysilane, without being limited thereto.

The (meth)acrylic copolymer may be a non-carboxylic acid group copolymer free from a carboxylic acid group in order to secure the resistance variation rate. However, the monomer mixture may include a carboxylic acid group-containing (meth)acrylic monomer in an amount of less than about 1 wt % in order to further reduce the resistance variation rate. The carboxylic acid group-containing (meth)acrylic monomer may include (meth)acrylic acid.

The initiator can form a (meth)acrylic copolymer from the monomer mixture or can cure the (meth)acrylic copolymer. The initiator may be a photopolymerization initiator or a heat polymerization initiator. The initiator may be the same as or different from the initiator used in preparation of a partially polymerized pre-polymer. The photopolymerization initiator may be any initiator so long as the initiator can realize a second crosslinking structure by deriving polymerization of the radical polymerizable compound during curing through light irradiation. For example, the photopolymerization initiator may include any of benzoin, acetophenone, hydroxy ketone, amino ketone, phosphine oxide photoinitiators, and the like. In an embodiment, the photopolymerization initiator may include any of benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-bis(diethylamino)benzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof. The heat polymerization initiator may be any typical initiator, for example, azo, peroxide and redox compounds, so long as the initiator can realize the second crosslinking structure by inducing polymerization of a polymerizable compound. Examples of the azo compound may include 2,2-azobis(2-methylbutyronitrile), 2,2-trilazobis(isobutyronitrile), 2,2-trilazobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include: inorganic peroxides such as potassium perchlorate, ammonium persulfate, and hydrogen peroxide; and organic peroxides such as diacylperoxide, peroxydicarbonate, peroxyester, tetramethylbutyl peroxyneodecanoate, bis (4-butylcyclohexyl)peroxydicarbonate, di(2-ethylhexyl)peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butylperoxy neoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reductant, without being limited thereto. These azo, peroxide, and redox compounds may be used alone or in combination thereof. The initiator may be present in an amount of about 0.01 parts by weight to about 5 parts by weight, and, in one embodiment, about 0.05 parts by weight to about 3 parts by weight, and, in one embodiment, about 0.1 parts by weight to about 1 part by weight, relative to 100 parts by weight of the monomer mixture for the (meth) acrylic copolymer. Within this range, the initiator allows complete curing of the adhesive film, can prevent or substantially prevent deterioration in transmittance of the adhesive film due to residual initiator, can reduce bubble generation in the adhesive film, and can exhibit good reactivity.

The adhesive composition may further include a crosslinking agent. The crosslinking agent can increase mechanical strength of the adhesive film through improvement in crosslinking degree of the adhesive composition. The crosslinking agent may include a polyfunctional (meth)acrylate capable of being cured by active energy rays. In an embodiment, the crosslinking agent may include: any of bifunctional acrylates, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-acryloyloxyethoxy)phenyl] fluorine; any of trifunctional acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethylisocyanurate; any of tetrafunctional acrylates, such as diglycerin tetra(meth)acrylate and pentaerythritol tetra(meth)acrylate; any of pentafunctional acrylates, such as dipentaerythritol penta(meth)acrylate; and any of hexafunctional acrylates, such as dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto. These crosslinking agents may be used alone or in combination thereof. Preferably, the crosslinking agent is a polyfunctional (meth)acrylate of polyhydric alcohol. The crosslinking agent may be optionally present in an amount of about 10 parts by weight or less, and, in one embodiment, about 0.03 parts by weight to about 7 parts by weight, and, in one embodiment, about 0.1 parts by weight to about 5 parts by weight, relative to 100 parts by weight of the monomer mixture for the (meth)acrylic copolymer. Within this range, the adhesive film exhibits good adhesion and improved reliability.

The adhesive composition may further include a silane coupling agent. The silane coupling agent may be a typical silane coupling agent known to those skilled in the art. For example, the silane coupling agent may include at least one selected from the group consisting of epoxylated silicon compounds, such as 3-glycidoxypropyltrimethoxysilane, 3-glycidoxypropyltriethoxysilane, 3-glycidoxypropylmethyldimethoxysilane, and 2-(3,4-epoxycyclohexyl)ethyltrimethoxysilane; polymerizable unsaturated group-containing silicon compounds, such as vinyltrimethoxysilane, vinyltriethoxysilane, and (meth)acryloxypropyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto. Preferably, the silane coupling agent includes an epoxylated silane coupling agent, or the silane coupling agent is an epoxylated silane coupling agent. The silane coupling agent may be optionally present in an amount of about 0.1 parts by weight or less, and, in one embodiment, about 0.05 to 0.1 parts by weight, relative to 100 parts by weight of the monomer mixture for the (meth)acrylic copolymer. Within this range, the adhesive film exhibit improved reliability.

The adhesive composition may further include any of typical additives, such as curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (e.g., coloring pigments, extender pigments, and the like), processing agents, UV blocking agents, fluorescent whitening agents, dispersants, heat stabilizers, photostabilizers, UV absorbers, antistatic agents, coagulants, lubricants, solvents, and the like.

The adhesive composition may have a viscosity at 25° C. of about 300 cP to about 50,000 cP. Within this viscosity range, the adhesive composition can have good coatability and thickness uniformity.

The adhesive composition may be prepared through partial polymerization of the monomer mixture for the (meth)acrylic copolymer, followed by adding the initiator thereto. The crosslinking agent, the silane coupling agent, and the additives described above may be further added to the monomer mixture. The adhesive composition may be prepared by preparing a viscous liquid including (meth)acrylic copolymers (pre-polymers) respectively containing a hydroxyl group and an alkyl group and the monomer mixture, which is not polymerized, through partial polymerization of the monomer mixture for the (meth)acrylic copolymer, followed by adding the initiator thereto. The crosslinking agent, the silane coupling agent, and the additives described above may be further added to the mixture. Partial polymerization may include solution polymerization, suspension polymerization, photopolymerization, bulk polymerization, or emulsion polymerization. In an embodiment, solution polymerization may be performed at about 50° C. to about 100° C. by adding an initiator to the monomer mixture. The initiator may include an acetophenone radical photopolymerization initiator such as 2,2-dimethoxy-2-phenylacetophenone, without being limited thereto. Partial polymerization may be performed to have a viscosity at 25° C. of about 1,000 cP to about 10,000 cP, and, in one embodiment, about 4,000 cP to about 9,000 cP.

The adhesive film may be produced by a typical method. For example, the adhesive film may be produced by coating the adhesive composition onto a release film, followed by curing. Curing may be performed under a low-pressure lamp at a wavelength of about 300 nm to about 400 nm and a dose of about 400 mJ/cm$^2$ to about 3,000 mJ/cm$^2$ in an oxygen-free state.

Next, an adhesive film according to another embodiment of the present invention will be described.

The adhesive film according to another embodiment may have a tan δ ratio of 1 to 2 as calculated by Equation 1, a tan δ ratio of about 0.1 to about 1.5 as calculated by Equation 2, and a restoration force of about 85% or higher, and, in one embodiment, about 85% to about 90%. With the tan δ ratios of Equation 1 and Equation 2, the adhesive film can exhibit good foldability at low temperature and room temperature. The adhesive film has a high restoration force of about 85% or higher and can prevent or substantially prevent formation of wrinkles when recovered to an original state after the adhesive film is folded for a long period of time. The adhesive film according to this embodiment is substantially the same as the adhesive film according to the above-described embodiment except that the adhesive film according to this embodiment has a restoration force of about 85% or higher.

The adhesive film according to an embodiment may include organic nanoparticles. The organic nanoparticles can secure good foldability of the adhesive film at room temperature and high temperature, improve viscoelasticity of the adhesive film at low temperature and/or room temperature, and have a cross-linked structure so as to allow the adhesive film to exhibit stable high temperature viscoelasticity. In addition, the organic nanoparticles can increase storage modulus at high temperature to improve reliability of the adhesive film at high temperature.

The organic nanoparticles may have a particular average particle diameter, and a difference in index of refraction between the organic nanoparticles and the (meth)acrylic copolymer may be small. Accordingly, although the adhesive film includes the organic nanoparticles, the adhesive film can secure high transparency. The organic nanoparticles may have an average particle diameter of about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, or about 400 nm. In an embodiment, the organic nanoparticles may have an average particle diameter in a range from one of the numerical values set forth above to another of the numerical values set forth above. For example, the organic nanoparticles may have an average particle diameter of about 10 nm to about 400 nm, and, in one embodiment, about 10 nm to about 300 nm, and, in one embodiment, about 10 nm to about 200 nm, and, in one embodiment, about 50 nm to about 150 nm. Within this range, the organic nanoparticles can be prevented or substantially prevented from agglomerating, do not affect foldability of the adhesive film, and can secure good transparency of the adhesive film. A difference in index of refraction between the organic nanoparticles and the (meth)acrylic copolymer may be about 0.05 or less, and, in one embodiment, about 0 to about 0.03, and, in one embodiment, about 0 to about 0.02. Within this range, the adhesive film exhibits good transparency. The organic nanoparticles may have an index of refraction of about 1.40 to about 1.70, and, in one embodiment, about 1.48 to about 1.60. Within this range, the adhesive film exhibits good transparency.

In one embodiment, the organic nanoparticles may have a core-shell structure, in which the core and the shell satisfy Equation 6. With the organic nanoparticles having this structure, the adhesive film can exhibit good foldability and effective balance between elasticity and flexibility.

$$Tg(c)<Tg(s)$$ Equation 6 where Tg(c) is the glass transition temperature (unit: ° C.) of the core and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particles so long as the core has a glass transition temperature satisfying the above equation.

In an embodiment, the core may have a glass transition temperature of about −150° C. to about 10° C., and, in one embodiment, about −150° C. to about −5° C., and, in one embodiment, about −150° C. to about −20° C. Within this range, the adhesive film has good viscoelasticity at low temperature and/or at room temperature. The core may include at least one of a poly(alkyl (meth)acrylate) and a polysiloxane each having a glass transition temperature within this range.

The poly(alkyl (meth)acrylate) includes at least one of poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), without being limited thereto.

The polysiloxane may be, for example, an organosiloxane (co)polymer. The organosiloxane (co)polymer may be a non-cross-linked or cross-linked organosiloxane (co)polymer. The cross-linked organosiloxane (co)polymer may be used to secure impact resistance and colorability. In an embodiment, the cross-linked organosiloxane (co)polymer may include any of cross-linked dimethylsiloxane, methylphenylsiloxane, diphenylsiloxane, and mixtures thereof. With a copolymer of two or more organosiloxanes, the nanoparticles can have an index of refraction of about 1.41 to about 1.50.

A cross-linked state of the organosiloxane (co)polymer can be determined based on the degree of dissolution in various organic solvents. As the degree of crosslinking of the organosiloxane (co)polymer intensifies, the degree of dissolution of the organosiloxane (co)polymer is reduced. A solvent for determination of the cross-linked state may include acetone, toluene, and the like. The organosiloxane (co)polymer may have a moiety which is not dissolved in acetone or toluene. The organosiloxane copolymer may include about 30% or more of insolubles in toluene.

The organosiloxane (co)polymer may further include an alkyl acrylate cross-linked polymer. The alkyl acrylate cross-linked polymer may include any of methyl acrylate, ethyl acrylate, n-butyl acrylate, 2-ethylhexyl acrylate, and the like. For example, the alkyl acrylate cross-linked polymer may be n-butyl acrylate or 2-ethylhexyl acrylate having a low glass transition temperature.

In an embodiment, the shell may have a glass transition temperature of about 15° C. to about 150° C., and, in one embodiment, about 35° C. to about 150° C., and, in one embodiment, about 50° C. to about 140° C. Within this range, the organic nanoparticles exhibit good dispersion in the (meth)acrylic copolymer. The shell may include poly(alkyl methacrylate) having a glass transition temperature within this range. For example, the shell may include at least one of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In the organic nanoparticles, the core may be present in an amount of about 30 wt % to about 99 wt %, and, in one embodiment, about 40 wt % to about 95 wt %, and, in one embodiment, about 50 wt % to about 90 wt %. Within this range, the adhesive film can exhibit good foldability in a wide temperature range.

In the organic nanoparticles, the shell may be present in an amount of about 1 wt % to about 70 wt %, and, in one embodiment, about 5 wt % to about 60 wt %, and, in one embodiment, about 10 wt % to about 50 wt %. Within this range, the adhesive film can exhibit good foldability in a wide temperature range.

The organic nanoparticles may be prepared by emulsion polymerization.

The organic nanoparticles may be present in an amount of about 0.1 parts by weight, about 0.2 parts by weight, about 0.3 parts by weight, about 0.4 parts by weight, about 0.5 parts by weight, about 0.6 parts by weight, about 0.7 parts by weight, about 0.8 parts by weight, about 0.9 parts by weight, about 1 part by weight, about 2 parts by weight, about 3 parts by weight, about 4 parts by weight, about 5 parts by weight, about 6 parts by weight, about 7 parts by weight, about 8 parts by weight, about 9 parts by weight, about 10 parts by weight, about 11 parts by weight, about 12 parts by weight, about 13 parts by weight, about 14 parts by weight, about 15 parts by weight, about 16 parts by weight, about 17 parts by weight, about 18 parts by weight, about 19 parts by weight, or about 20 parts by weight relative to 100 parts by weight of the monomer mixture for the (meth) acrylic copolymer. In an embodiment, the organic nanoparticles may be present in an amount in a range from one of the numerical values set forth above to another of the numerical values set forth above. For example, the organic nanoparticles may be present in an amount of about 0.1 to 20 parts by weight, and, in one embodiment, about 0.5 to 10 parts by weight, and, in one embodiment, about 0.5 to 5 parts by weight, relative to 100 parts by weight of the monomer mixture for the (meth)acrylic copolymer. Within this range, the adhesive film can have balance between viscoelasticity, storage modulus, and restoration force, and can exhibit good foldability at high temperature.

The adhesive film according to an embodiment may be formed of an adhesive composition that includes a monomer mixture including a hydroxyl group-containing (meth) acrylic acid ester and an alkyl group-containing (meth) acrylic acid ester, an initiator, and organic nanoparticles. The adhesive film according to this embodiment is substantially the same as the adhesive composition according to the above-described embodiment except that the adhesive film according to this embodiment further includes the organic nanoparticles.

An optical member according to an embodiment of the present invention includes an optical film, and an adhesive film formed on at least one surface of the optical film, and the adhesive film includes the adhesive film according to an embodiment of the present invention. Accordingly, the optical member exhibits good bending properties and/or good foldability, and thus can be used in a flexible display.

In an embodiment, the optical film provides optical functions, such as polarization, optical compensation, display quality improvement and/or conductivity, to a display, and may include any of a polarizing plate, a color filter, a retardation film, an elliptical polarizing film, a reflective film, an anti-reflection film, a compensation film, a brightness improving film, an alignment film, a light diffusion film, a glass shatterproof film, a surface protective film, a plastic LCD substrate, a transparent conductive film such as an indium tin oxide (ITO) film, and the like. The optical film can be easily produced by a person having ordinary knowledge in the art. For example, a window film or the optical film may be attached to a touch pad via the adhesive film, thereby forming a touch panel. Alternatively, the optical film may be applied to a typical polarizing film via the adhesive film as in the art.

In another embodiment, the optical film is an optically transparent film, and an optical member including the optical film and the adhesive film may act as a support layer of a display device. For example, the display device may include a window film or the like. The window film may include the optical member and a window coating layer (e.g., a silicon coating layer) formed on the optical member. In an embodiment, the optical film may have a total luminous transmittance of about 90% or more in the visible region, and may be formed of at least one resin selected from among cellulose resins such as triacetylcellulose, polyester resins such as polyethylene terephthalate, polyethylene naphthalate, polybutylene terephthalate, and polybutylene naphthalate, polycarbonate resins, polyimide resins, polystyrene resins, poly(meth)acrylate resins such as poly(methyl methacrylate), cyclic olefin polymer resin, acrylic resins, and polyamide resins. The optical film may have a thickness of about 10 µm to about 100 µm, specifically about 20 µm to about 75 µm, more specifically about 30 µm to about 50 µm. Within this thickness range, the optical member can be used as the support layer in the display device.

The optical member may be a two-layer film laminate that includes an optical film and an adhesive film formed on a surface of the optical film. Alternatively, the optical member may be a three- or more layer film laminate that includes at least two optical films attached to each other via the adhesive film according to an embodiment of the present invention.

In one embodiment, the optical member may be a three-layer film laminate that includes a first optical film, a second optical film, and an adhesive film interposed between the first optical film and the second optical film to attach the first optical film to the second optical film, wherein the adhesive film is an adhesive film according to an embodiment of the present invention. Each of the first optical film and the second optical film may be formed of at least one resin selected from among a polyethylene terephthalate resin, a polycarbonate resin, a polyimide resin, a poly(meth)acrylate resin, a cyclic olefin polymer resin, and an acrylic resin. Each of the first optical film and the second optical film may have a thickness of about 10 µm to about 100 µm, and, in one embodiment, about 20 µm to about 75 µm, and, in one embodiment, about 30 µm to about 50 µm, and the adhesive film may have a thickness of about 10 µm to about 100 µm. Within this thickness range, the optical member can maximize or increase impact resistance while maintaining good foldability. The first optical film and the second optical film may have different thicknesses and may be formed of different materials.

An optical display according to an embodiment of the present invention includes the adhesive film according to an embodiment the present invention. The optical display may include any of an organic light emitting diode (OLED) display, a liquid crystal display, and the like. The optical display may include a flexible display. In one or more embodiments, the optical display may include a non-flexible display.

Figure 5:
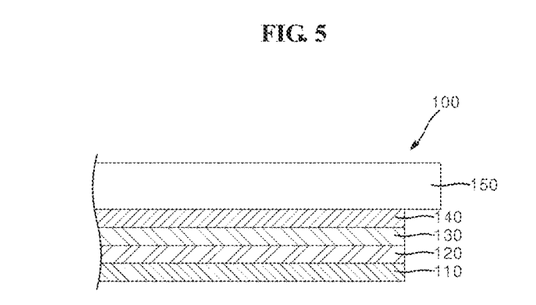
FIG. 5 is a sectional view of a flexible display according to an embodiment of the present invention.

Next, a flexible display according to an embodiment of the invention will be described with reference to FIG. 5. FIG. 5 is a sectional view of a flexible display according to an embodiment of the present invention.

Referring to FIG. 5, a flexible display 100 according to an embodiment of the invention may include a display unit 110, an adhesive layer 120, a polarizing plate 130, a touchscreen panel 140, and a flexible window film 150, wherein the adhesive layer 120 may include the adhesive film according to an embodiment of the present invention.

The display unit 110 serves to drive the flexible display 100, and may include a substrate and an optical device including an OLED, an LED, or an LCD element formed on the substrate. Although not shown in FIG. 5, the display unit 110 may include a lower substrate, a thin film transistor, an organic light emitting diode, a flattening layer, a protective layer, and an insulation layer.

The polarizing plate 130 can realize polarization of internal light or prevent or substantially prevent reflection of external light to realize a display, or can increase contrast of the display. The polarizing plate 130 may be composed of a polarizer alone. Alternatively, the polarizing plate 130 may include a polarizer and a protective film formed on one or both surfaces of the polarizer. Alternatively, the polarizing plate 130 may include a polarizer and a protective coating layer formed on one or both surfaces of the polarizer. As the polarizer, the protective film and the protective coating layer, a typical polarizer, a typical protective film and a typical protective coating layer known in the art may be used.

The touchscreen panel 140 generates electrical signals through detection of variation in capacitance when a human body or a conductor, such as a stylus, touches the touchscreen panel 140, and the display unit 110 may be driven by such electrical signals. The touchscreen panel 140 is formed by patterning a flexible conductive conductor, and may include first sensor electrodes and second sensor electrodes each formed between the first sensor electrodes and intersecting the first sensor electrodes. The touchscreen panel 140 may include a conductive material, such as metal nanowires, conductive polymers, and carbon nanotubes, without being limited thereto.

The flexible window film 150 is formed as an outermost layer of the flexible display 100 to protect the flexible display.

Although not shown in FIG. 5, adhesive layers may be further formed between the polarizing plate 130 and the touchscreen panel 140 and/or between the touchscreen panel 140 and the flexible window film 150 to reinforce bonding between the polarizing plate 130, the touchscreen panel 140, and the flexible window film 150. In an embodiment, the adhesive layers may be formed of an adhesive composition that includes a (meth)acrylic resin, a curing agent, an initiator, and a silane coupling agent. In another embodiment, the adhesive layers may include the adhesive films according to the embodiments of the invention. In addition, although not shown in FIG. 5, a polarizing plate may be further disposed under the display unit 110, thereby realizing polarization of internal light.

Next, aspect and effects of the present invention will be described in further detail with reference to some examples. However, it should be understood that these examples are provided for illustration only and are not to be construed in any way as limiting the present invention.

PREPARATIVE EXAMPLE

Organic nanoparticles were prepared by emulsion polymerization. The core was formed of poly(butyl acrylate), and the shell was formed of poly(methyl methacrylate). In the organic nanoparticles, the shell was present in an amount of 35 wt % and the core was present in an amount of 65 wt %, and the organic nanoparticles had an average particle diameter of 100 nm and an index of refraction of 1.48.

Example 1

100 parts by weight of a monomer mixture comprising 20 parts by weight of 4-hydroxybutyl acrylate (4-HBA), 80 parts by weight of 2-ethylhexyl acrylate (2-EHA), and 0.03 parts by weight of Irgacure 651 (2,2-dimethoxy-2-phenylacetophenone, BASF) as an initiator were sufficiently mixed in a reactor. After substituting dissolved oxygen in the reactor with nitrogen gas, the mixture was subjected to partial polymerization through irradiation with UV light for several minutes using a low-pressure mercury lamp, thereby preparing a viscous liquid having a viscosity of 5,000 cP at 25° C. 0.5 parts by weight of Irgacure 184 (1-hydroxycyclohexylphenylketone, BASF) as an initiator was added to the viscous liquid and mixed therewith, thereby preparing an adhesive composition. The adhesive composition was coated onto a polyethylene terephthalate (PET) release film and irradiated with UV light at a dose of 2,000 mJ/cm$^2$, thereby producing an adhesive sheet in which a 50 μm thick adhesive film is formed on the PET film.

Example 2

100 parts by weight of a monomer mixture comprising 17 parts by weight of 4-HBA, 83 parts by weight of 2-EHA, 1 part by weight of the organic nanoparticles prepared in the Preparative Example, and 0.03 parts by weight of Irgacure 651 (2,2-dimethoxy-2-phenylacetophenone, BASF) as an initiator were sufficiently mixed in a reactor. After substituting dissolved oxygen in the reactor with nitrogen gas, the mixture was subjected to partial polymerization through irradiation with UV light for several minutes using a low-pressure mercury lamp, thereby preparing a viscous liquid having a viscosity of 5,000 cP at 25° C. 0.5 parts by weight of an initiator Irgacure 184 (1-hydroxycyclohexylphenylketone, BASF) was added to the viscous liquid and mixed therewith, thereby preparing an adhesive composition. An adhesive sheet was manufactured in the same manner as in Example 1.

Example 3

An adhesive sheet was manufactured in the same manner as in Example 2, except that 100 parts by weight of a monomer mixture comprising 20 parts by weight of 4-HBA and 80 parts by weight of 2-EHA was used.

Comparative Example 1

100 parts by weight of a monomer mixture comprising 54 parts by weight of 2-EHA, 20 parts by weight of isobornyl acrylate (IBOA), 25 parts by weight of 2-hydroxyethyl acrylate (2-HEA) 1 part by weight of acrylic acid (AA), and 0.03 parts by weight of Irgacure 651 (2,2-dimethoxy-2-phenylacetophenone, BASF) as an initiator were sufficiently mixed in a reactor. After substituting dissolved oxygen in the reactor with nitrogen gas, the mixture was subjected to partial polymerization through irradiation with UV light for several minutes using a low-pressure mercury lamp, thereby preparing a viscous liquid having a viscosity of 5,000 cP at 25° C. 0.5 parts by weight of Irgacure 184 (1-hydroxycyclohexylphenylketone, BASF) as an initiator was added to the viscous liquid and mixed therewith, thereby preparing an adhesive composition. An adhesive sheet was manufactured in the same manner as in Example 1.

Comparative Example 2

An adhesive sheet was manufactured in the same manner as in Comparative Example 1, except that 100 parts by weight of a monomer mixture comprising 60 parts by weight of 2-EHA, 35 parts by weight of 2-HEA, and 5 parts by weight of acryloylmorpholine (ACMO) was used.

Comparative Examples 3 and 4

Adhesive sheets were produced in the same manner as in Comparative Example 1 and Comparative Example 2, except that the monomer mixture was changed as listed in Table 2.

Details of components of the adhesive sheets prepared in the Examples and Comparative Examples are shown in Tables 1 and 2. The adhesive films of the Examples and Comparative Examples were evaluated as to the properties as listed in Tables 1 and 2.

(1) Modulus: Viscoelasticity was measured at a constant temperature of −20° C. under auto-strain conditions of a strain of 1% while increasing the shear rate from 0.1 rad/sec to 100 rad/sec using a dynamic viscoelasticity instrument ARES (MCR-501, Anton Paar Co., Ltd.). After removal of the release film, 50 μm thick adhesive films were stacked to a thickness of 500 μm, followed by punching the stack structure using an 8-mm diameter punching machine, thereby preparing a specimen for measurement of modulus. Storage modulus (G') and loss modulus (G") were calculated and tan δ was obtained by G"/G'. Then, the tan δ ratios were calculated according to Equation 1 and Equation 2. Modulus, tan δ, and tan δ ratio were obtained under conditions of a constant temperature of 25° C. and a constant temperature of 80° C. in the same manner as described above.

Figure 1:
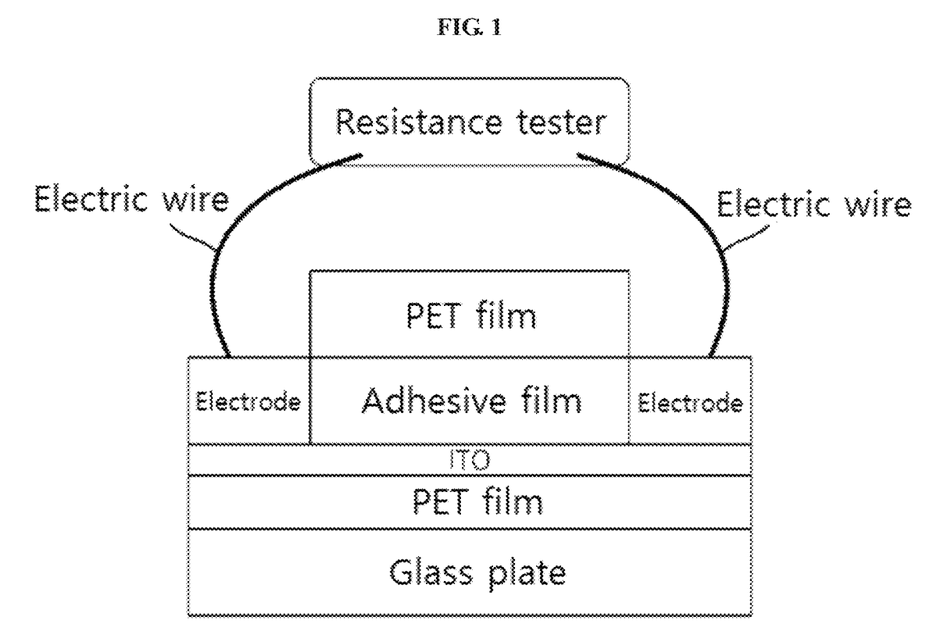
FIG. 1 is a conceptual diagram of a specimen for measuring resistance variation rate.

(2) Resistance variation rate: Referring to FIG. 1, a polyethylene terephthalate (PET) film coated with indium tin oxide (ITO) was stacked on a glass plate, and a stack of adhesive film obtained in (1) and a PET film was placed at the middle of the ITO surface. Then, a specimen was prepared by forming electrodes at both ends of the ITO film, to which the adhesive film was not attached, using silver pastes. Initial resistance $P^1$ was measured by connecting an electric wire to both electrodes of the specimen. Then, the specimen was left at 60° C. and 95% RH for 250 hours, followed by measurement of resistance $P^2$. Resistance variation rate was obtained according to Equation 4.

Figure 2A:
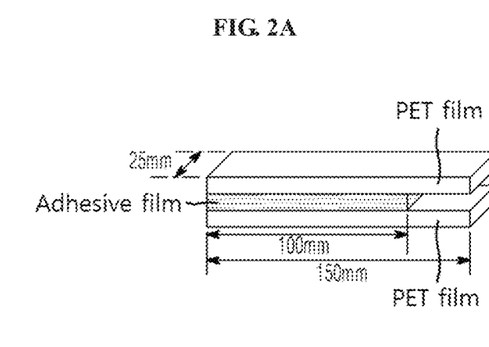
FIGS. 2A and 2B are conceptual sectional views of a specimen for measuring peel strength.
Figure 2B:
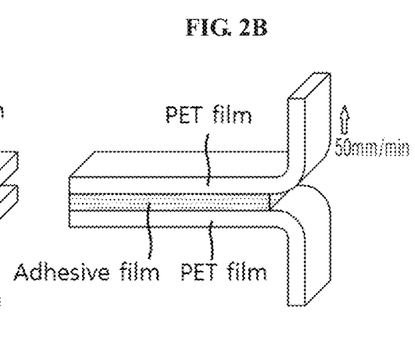

(3) Peel strength: A PET film having a size of 150 mm×25 mm×75 μm (length×width×thickness) was subjected to corona treatment twice (total dose: 156) under plasma discharge at 78 doses using a corona treatment device. An adhesive film sample having a size of 100 mm×25 mm×50 μm (length×width×thickness) was obtained from each of the adhesive sheets of the Examples and Comparative Examples. The corona-treated surfaces of the PET films were stacked on both surfaces of the adhesive film sample, thereby preparing a specimen, as shown in FIG. 2A. The specimen was autoclaved under conditions of about 3.5 bar and about 50° C. for about 1,000 seconds and secured to a TA.XT_Plus texture analyzer (Stable Micro System Co., Ltd.). Referring to FIG. 2B, with the PET film secured at one side thereof to the TA.XT_Plus Texture Analyzer, T-peel strength at 25° C. was measured by pulling the other side of the PET film at 50 mm/min.

(4) Haze: Haze was measured using a haze meter (NDH 5000, Nippon Denshoku Co., Ltd.). Haze was measured on a 50 μm thick adhesive film in accordance with ASTM (American Society for Testing and Measurement) D 1003-95 5 (Standard Test for Haze and Luminous Transmittance of Transparent Plastic).

(5) Gel fraction: An adhesive film was obtained by removing a release film from each of the adhesive films of the Examples and Comparative Examples. Gel fraction was measured with respect to 1 g of the adhesive film according to Equation 3. Here, a 100-mL wide neck bottle was used as the sample bottle and a 200 mesh iron net was used as the wire mesh.

(6) Restoration force: An adhesive film was obtained by removing a release film from each of the adhesive sheets of the Examples and Comparative Examples. Restoration force was evaluated at 25° C. using a TA.XT_Plus Texture Analyzer (Stable Micro System Co., Ltd.).

Referring to FIGS. 3A and 3B, assuming that both ends of a polyethylene terephthalate (PET) film (thickness: 75 μm) having a size of 50 mm×20 mm are defined as a first end and a second end, respectively, two PET films were attached to each other via an adhesive film having a size of 20 mm×20 mm such that two ends of the PET films were attached to each other by the adhesive film in order of first end of one PET film/adhesive film/second end of another PET film, thereby providing a specimen having a contact area of 20 mm×20 mm between each of the PET films and the adhesive film. Jigs were secured to both ends of the PET films of the specimen, respectively. A contact area between the PET film and the jig was set to a size of 15 mm×20 mm.

Referring to FIGS. 3A and 3B and FIG. 4, with one of the jigs secured at 25° C., the other jig was pulled at about 300 mm/min until the adhesive film has a length ($X_3$, unit: μm) of 1,000% an initial thickness ($X_0$, unit: μm) thereof, that is, 10 times the initial thickness of the adhesive film, and was maintained for about 10 seconds, followed by restoring the other jig at the same speed (at about 300 mm/min) to obtain a stretched length ($X_2$, unit: μm) of the adhesive film upon application of 0 kPa to the adhesive film. In the graph of FIG. 4, the X-axis is the stretched length of the adhesive film and the Y-axis is the force applied to the adhesive film. Restoration force was calculated by Equation 5.

(7) Tg of adhesive film: A sample of 15 mg of each of the adhesive films (on 6 mm Al Pan) of the Examples and Comparative Examples was prepared and heated to 180° C. at a heating rate of 20° C./min in a nitrogen atmosphere (50 mL/min), followed by cooling to −100° C. (first heating condition (1st run)). Next, while the specimen was heated to 100° C. at a heating rate of 10° C./min, the glass transition temperature (Tg) of the specimen was measured using a DSC Discovery (TA Instrument).

(8) Foldability: A 50 μm thick adhesive film was obtained by removing the release films from each of the adhesive sheets of the Examples and Comparative Examples. The adhesive film (thickness: 50 μm) was placed between corona-treated polyethylene terephthalate (PET) films (thickness: 50 μm), bonded to the PET films through rollers such that the corona-treated surfaces of the PET films adjoined the adhesive film, followed by aging at room temperature for 12 hours. Next, the resultant was cut into a specimen having a size of 70 mm×140 mm (width×length). Then, the specimen was secured to a flexibility evaluation instrument (CFT-200, Covotech Co., Ltd.) using an adhesive (4965, Tesa Co., Ltd.), followed by repeating an operation of folding and unfolding the specimen (length: 140 mm) in the longitudinal direction at −20° C. or 25° C. and at a folding frequency of 30 cycles/min such that the radius of curvature became 3 mm (1 cycle being defined as an operation of folding the specimen in half once and unfolding the specimen). Under these conditions of the bending operation, a minimum number of cycles causing cracks on the polyethylene terephthalate film was measured while observing the polyethylene terephthalate film with the naked eye. An adhesive film having a large minimum number of cycles means an adhesive film capable of easily relieving stress applied to the polyethylene terephthalate films caused by bending. An adhesive film having a minimum number of cycles of 100,000 or more was rated as O, an adhesive film having a minimum number of cycles of 70,000 or more was rated as Δ, and an adhesive film having a minimum number of cycles of less than 70,000 was rated as X. Foldability was evaluated at −20° C. and at 25° C.

(9) Durability: An adhesive film was obtained by removing a release film from each of the adhesive sheets of the Examples and Comparative Examples. A specimen was prepared by sequentially stacking the adhesive film and a glass plate or a polycarbonate film on an ITO film. The specimen was autoclaved and then left at 60° C. and 90% RH for 500 hours. Slight lifting, delamination, or bubbling was observed at the interface between the adhesive film and the glass plate or the polycarbonate film with the naked eye. No bubble generation or delamination was rated as O, slight bubble generation or delamination was rated as Δ, and severe bubble generation or delamination was rated as X.

TABLE 1

| | | Example 1 | Example 2 | Example 3 |
|---|---|---|---|---|
| Monomer | 4-HBA (parts by weight) | 20 | 17 | 20 |
| | 2-EHA (parts by weight) | 80 | 83 | 80 |
| Organic nanoparticles (parts by weight) | | 0 | 1 | 1 |
| −20° C. | G' (kPa, 1 rad/sec) | 72 | 68 | 74 |
| | tan δ (1 rad/sec) | 0.43 | 0.59 | 0.53 |
| | G' (kPa, 100 rad/sec) | 215 | 832 | 951 |
| | tan δ (100 rad/sec) | 0.14 | 0.69 | 0.46 |
| | tan δ ratio | 0.33 | 1.17 | 0.87 |
| 25° C. | G' (kPa, 1 rad/sec) | 27 | 28 | 31 |
| | tan δ (1 rad/sec) | 0.25 | 0.26 | 0.24 |
| | G' (kPa, 100 rad/sec) | 61.2 | 60.9 | 65 |
| | tan δ (100 rad/sec) | 0.39 | 0.41 | 0.41 |
| | tan δ ratio | 1.56 | 1.58 | 1.71 |
| 80° C. | G' (kPa, 1 rad/sec) | 18 | 19 | 21 |
| Resistance variation rate (%) | | 3 | 3 | 2 |
| Peel strength (gf/inch) | | 1500 | 1400 | 1630 |
| Gel fraction (%) | | 78 | 75 | 74 |
| Haze (%) | | 0.57 | 0.7 | 0.92 |
| Restoration force (%) | | 80 | 85 | 90 |
| Tg of adhesive film (° C.) | | −56 | −58 | −56 |
| −20° C. | Foldability | O (100,000 cycles) | O (100,000 cycles) | O (100,000 cycles) |
| 25° C. | Foldability | O (100,000 cycles) | O (100,000 cycles) | O (100,000 cycles) |
| Durability | | O | O | O |

TABLE 2

| | | Comparative Example 1 | 2 | 3 | 4 |
|---|---|---|---|---|---|
| Monomer | 2-EHA (parts by weight) | 54 | 60 | 57 | 84 |
| | IBOA (parts by weight) | 20 | — | 18 | — |
| | 2-HEA (parts by weight) | 25 | 35 | 22 | 15 |
| | AA (parts by weight) | 1 | — | 3 | 1 |
| | ACMO (parts by weight) | — | 5 | — | — |
| −20° C. | G' (kPa, 1 rad/sec) | 550 | 580 | 550 | 430 |
| | tan δ (1 rad/sec) | 0.98 | 1.3 | 1 | 0.85 |
| | G' (kPa, 100 rad/sec) | Unmeasurable | Unmeasurable | Unmeasurable | Unmeasurable |
| | tan δ (100 rad/sec) | Unmeasurable | Unmeasurable | Unmeasurable | Unmeasurable |
| | tan δ ratio | Unmeasurable | Unmeasurable | Unmeasurable | Unmeasurable |
| 25° C. | G' (kPa, 1 rad/sec) | 31.5 | 17 | 23.8 | 48 |
| | tan δ (1 rad/sec) | 0.18 | 0.14 | 0.235 | 0.325 |
| | G' (kPa, 100 rad/sec) | 54 | 32 | 70.1 | 185 |
| | tan δ (100 rad/sec) | 0.34 | 0.55 | 0.89 | 1.04 |
| | tan δ ratio | 1.89 | 3.93 | 3.79 | 3.20 |
| 80° C. | G' (kPa, 1 rad/sec) | 31.5 | 35.5 | 19.9 | 24.6 |
| Resistance variation rate (%) | | 3 | 2 | 5 | 3 |
| Peel strength (gf/inch) | | 1900 | 2700 | 2400 | 2000 |
| Gel fraction (%) | | 85 | 74 | 74 | 92 |
| Haze (%) | | 0.57 | 0.57 | 0.57 | 0.57 |
| Restoration force (%) | | 75% | 88% | 80% | 74% |
| Tg of adhesive film (° C.) | | −20 | −30 | −23 | −50 |
| −20° C. | Foldability | X (less than 10 cycles) | X (less than 10 cycles) | X (less than 10 cycles) | X (less than 100 cycles) |
| 25° C. | Foldability | X (40,000 cycles) | X (500 cycles) | X (less than 1,000 cycles) | X (less than 10,000 cycles) |
| Durability | | O | O | O | O |

As shown in Table 1, each of the adhesive films of the Examples had tan δ within the range according to the present invention and thus exhibited good foldability at room temperature and low temperature. In addition, the adhesive films of Examples 2 and 3, which include organic nanoparticles, had low haze and were optically transparent. Further, the adhesive films of Examples 2 and 3 had high restoration force and did not suffer from wrinkling, even when the adhesive films were restored into an original state after being held in a folded state for a long period of time.

Conversely, as shown in Table 2, each of the adhesive films of Comparative Examples 1 to 4 had tan δ deviating from the range according to the present invention and thus exhibited low foldability due to stress upon folding.

It is to be understood that various modifications, changes, alterations, and equivalent embodiments can be made by those skilled in the art without departing from the spirit and scope of the invention.

Some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used alone or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive film having a tan δ ratio at 25° C. of about 1 to about 2 as calculated by Equation 1 and a tan δ ratio at −20° C. of about 0.1 to about 1.5 as calculated by Equation 2, the adhesive film being formed of an adhesive composition comprising a (meth)acrylic copolymer formed of monomer mixture comprising a hydroxyl group-containing (meth) acrylic acid ester and an alkyl group-containing (meth) acrylic acid ester, wherein $$\tan \delta \text{ ratio at 25° C.} = ([\tan \delta]_{100/25° C.})/([\tan \delta]_{1/25° C.}), \quad \text{Equation 1}$$

where $[\tan \delta]_{1/25° C.}$ is tan δ of the adhesive film at about 1 rad/sec and about 25° C., and
$[\tan \delta]_{100/25° C.}$ is tan δ of the adhesive film at about 100 rad/sec and about 25° C., and $$\text{Tan } \delta \text{ at } -20° C. = ([\tan \delta]_{100/-20° C.})/([\tan \text{delta}]_{1/-20° C.}), \quad \text{Equation 2}$$

where $[\tan \delta]_{1/-20° C.}$ is tan δ of the adhesive film at about 1 rad/sec and about −20° C., and
$[\tan \delta]_{100/-20° C.}$ is tan δ of the adhesive film at about 100 rad/sec and about −20° C., and
wherein the adhesive film has a peel strength at 25° C. of about 700 gf/inch or higher,
wherein the adhesive film has a storage modulus of about 20 kPa to about 70 kPa at 25° C. and 100 rad/sec,
wherein the adhesive film has a storage modulus of about 200 kPa to about 1000 kPa at −20° C. and 100 rad/sec, and
wherein the (meth)acrylic copolymer formed of the monomer mixture has a glass transition temperature Tg of about −150° C. to about −13° C., and
wherein the adhesive film has a glass transition temperature of about −100° C. to less than about −30° C.,
wherein the adhesive composition is obtained by:
mixing the monomer mixture with a first initiator and conducting partial polymerization to prepare a liquid having a viscosity of about 4,000 cP to about 9,000 cP at 25° C., and
mixing the liquid with a second initiator different from the first initiator.

2. The adhesive film according to claim 1, wherein a homopolymer of the hydroxyl group-containing (meth) acrylic acid ester has a glass transition temperature of about 0° C. or less.

3. The adhesive film according to claim 1, wherein the hydroxyl group-containing (meth)acrylic acid ester comprises at least one (meth)acrylic acid ester containing a $C_4$ to $C_{20}$ alkyl group having at least one hydroxyl group.

4. The adhesive film according to claim 1, wherein the monomer mixture comprises about 75 wt % to about 90 wt % of the alkyl group-containing (meth)acrylic acid ester.

5. The adhesive film according to claim 1, wherein the adhesive film has tan δ of about 0.3 to about 0.7 and a storage modulus of about 50 kPa to about 100 kPa at −20° C. and at 1 rad/sec.

6. The adhesive film according to claim 1, wherein the adhesive film has tan δ of about 0.1 to about 0.75 and a storage modulus of about 200 kPa to about 1,000 kPa at −20° C. and at 100 rad/sec.

7. The adhesive film according to claim 1, wherein the adhesive film has a resistance variation rate of about 3% or less as calculated by Equation 4:

$$\text{Resistance variation rate (\%)} = (P^2 - P^1)/P^1 \times 100,$$

where $P^1$ is initial resistance (unit: Ω) of a specimen having electrodes at both ends of an adhesive film, and $P^2$ is resistance (unit: Ω) of the specimen as measured after the specimen is left at about 60° C. and about 95% RH for about 250 hours.

8. The adhesive film according to claim 1, further comprising organic nanoparticles.

9. The adhesive film according to claim 8, wherein the organic nanoparticles have an average particle diameter of about 10 nm to about 400 nm.

10. The adhesive film according to claim 8, wherein the organic nanoparticles have a core-shell structure.

11. The adhesive film according to claim 10, wherein a core and a shell of the core-shell structure satisfy Equation 6:

$$Tg(c) < Tg(s),$$

where Tg(c) is a glass transition temperature (unit: ° C.) of the core and Tg(s) is a glass transition temperature (unit: ° C.) of the shell.

12. The adhesive film according to claim 10, wherein a core of the core-shell structure is formed of at least one of poly(butyl acrylate) and polysiloxane, and a shell of the core-shell structure comprises poly(methyl methacrylate).

13. The adhesive film according to claim 8, wherein the organic nanoparticles are present in an amount of about 0.1 parts by weight to about 20 parts by weight relative to 100 parts by weight of the monomer mixture.

14. An optical member comprising an optical film and an adhesive film on at least one surface of the optical film, the adhesive film comprising the adhesive film according to claim 1.

15. The optical member according to claim 14, wherein the optical member comprises a three-layer film laminate comprising a first optical film, a second optical film, and the adhesive film between the first optical film and the second optical film to attach the first optical film to the second optical film.

16. The optical member according to claim 15, wherein each of the first optical film and the second optical film comprises at least one resin selected from among a polyethylene terephthalate resin, a polycarbonate resin, a polyimide resin, a poly(meth)acrylate resin, a cyclic olefin polymer resin, and an acrylic resin.

17. The optical member according to claim 15, wherein each of the first optical film and the second optical film has a thickness of about 10 μm to about 100 μm.

18. A window film comprising:
the optical member according to claim 14; and
a window coating layer on the optical member.

19. An optical display comprising the adhesive film according to claim 1.

20. The adhesive film according to claim 1, wherein the monomer mixture comprises about 10 wt % to about 25 wt % of the hydroxyl group-containing (meth)acrylic acid ester.

21. The adhesive film according to claim 1, wherein the adhesive film has a gel fraction of about 70% to about 85%.

* * * * *